United States Patent
Dufner et al.

(10) Patent No.: US 7,759,884 B2
(45) Date of Patent: Jul. 20, 2010

(54) METHOD AND ARRANGEMENT FOR COMMUTATING AN ELECTRONICALLY COMMUTATED MOTOR

(75) Inventors: Thomas Dufner, Schonach (DE); Frank Heller, Königsfeld-Burgberg (DE); Arno Karwath, Deisslingen (DE)

(73) Assignee: EBM-Papst St. Georgen GmbH & Co. KG, St. Georgen (DE)

( * ) Notice: Subject to any disclaimer, the term of this patent is extended or adjusted under 35 U.S.C. 154(b) by 349 days.

(21) Appl. No.: 11/558,942

(22) Filed: Nov. 13, 2006

(65) Prior Publication Data

US 2007/0189739 A1  Aug. 16, 2007

(30) Foreign Application Priority Data

Nov. 11, 2005  (DE) ...................... 10 2005 055 327

(51) Int. Cl.
*H02P 6/00* (2006.01)

(52) U.S. Cl. ........................... 318/400.01; 318/400.13; 318/400.14; 318/700

(58) Field of Classification Search ............ 318/400.14, 318/400.13, 400.01, 700, 43
See application file for complete search history.

(56) References Cited

U.S. PATENT DOCUMENTS

| | | | | |
|---|---|---|---|---|
| 4,654,566 A | * | 3/1987 | Erdman .................. 318/400.01 |
| 5,076,076 A | * | 12/1991 | Payne ......................... 68/12.14 |
| 5,457,366 A | * | 10/1995 | Wehberg et al. ........ 318/400.17 |
| 5,491,978 A | * | 2/1996 | Young et al. ................... 62/126 |
| 6,078,152 A | * | 6/2000 | Dieterle et al. .............. 318/264 |
| 6,163,117 A | * | 12/2000 | Rappenecker .......... 318/400.04 |
| 6,215,261 B1 | * | 4/2001 | Becerra ................. 318/400.26 |
| 6,825,627 B2 | * | 11/2004 | Berroth et al. ......... 318/400.13 |
| 7,319,300 B2 | * | 1/2008 | Hahn ..................... 318/400.32 |

\* cited by examiner

*Primary Examiner*—Bentsu Ro
*Assistant Examiner*—David S Luo
(74) *Attorney, Agent, or Firm*—Oliver Intellectual Property LLC; Milton Oliver, Esq.

(57) ABSTRACT

An electronically commutated motor has a permanent-magnet rotor (124) having: at least two rotor poles (183, 186, 188, 189); at least one phase (126); a power stage (122); and a rotor position sensor (140). Associated therewith is a control circuit implemented to carry out the following steps in order to even out the motor current (320): A) after a change of the rotor position signal (182), referred to as a first pole change, a first value (I_MEAS(HCnt-1)) of the current through the at least one phase (126) is ascertained; B) after a predetermined time span (T_Default+T_Offset(HCnt-1)), a new commutation is carried out; C) after a change of the rotor position signal (182), referred to as a second pole change, a second value for the motor current (I_MEAS(HCnt)) is ascertained; D) as a function of the difference between the first value (I_MEAS(HCnt-1)) and second value (I_MEAS(HCnt)), the value for the predetermined time span is modified.

25 Claims, 8 Drawing Sheets

US 7,759,884 B2

METHOD AND ARRANGEMENT FOR COMMUTATING AN ELECTRONICALLY COMMUTATED MOTOR

FIELD OF THE INVENTION

The present invention relates to a method and an arrangement for commutating an electronically commutated motor.

BACKGROUND

During the operation of electronically commutated motors (ECMs), asymmetries that influence efficiency can occur in the context of commutation. The reasons therefor can be categorized as either static influences or dynamic influences.

Examples of static influences are Hall sensors (or other rotor-position sensors) that are inaccurately placed, permanent magnets of the rotor that are asymmetrically magnetized or installed, leakage fluxes in the stator, and asymmetries in the motor current.

Examples of dynamic influences are rotation speed fluctuations caused by external influences, in particular changes in temperature; rotor vibrations; and software jitters. The latter are understood to be small time differences in the execution of instructions, which differences are only a few microseconds in magnitude and occur randomly, i.e. cannot be influenced.

SUMMARY OF THE INVENTION

It is an object of the invention to provide a novel method and a novel arrangement for commutating an electronically commutated motor.

This object is achieved by a method including ascertaining a first value (I_MEAS(Hcnt−1) of the motor current, performing a new commutation a predetermined time thereafter, ascertaining a second value (I_MEAS(Hcnt), and in accordance therewith, modifying a value of the predetermined time span. The invention is also directed to an apparatus for performing the method.

The invention is based on the realization that static and dynamic influences, i.e., for example, production tolerances in the manufacture of an ECM, as well as certain boundary conditions and operating parameters, can lead to asymmetries in the motor current. A basic idea of the invention is to influence the motor current of an ECM by means of individualized commutation, in such a way that these asymmetries are reduced and the efficiency of the ECM is thus improved. The invention is not limited to a specific type of motor.

In particular, the object of the present invention is achieved by A) after a change of the rotor position signal (182), which change is associated with a pole change that follows a commutation of the motor current (320) through the at least one phase (126) and that is referred to hereinafter as a first pole change, ascertaining a first value (I_MEAS(HCnt−1)) of the motor current; B) performing a new commutation after elapse of a predetermined time span (T_Default+T_Offset(HCnt−1)) subsequent to the first pole change; C) after a change of the rotor position signal (182), which change follows the new commutation and is associated with a pole change that is hereinafter referred to as a second pole change, ascertaining a second value for the motor current (I_MEAS(HCnt)); and D) as a function of the difference between the first value (I_MEAS(HCnt−1)) and second value (I_MEAS(HCnt)), modifying a value of said predetermined time span (T_Default+T_Offset(HCnt−1)) in order to bring about, when this modified value is applied, an improved equalization of the first value for the motor current and the second value for the motor current.

In accordance therewith, an asymmetry in the motor current is ascertained by determining a deviation that indicates a change in the motor current during rotation of the rotor of the ECM. As a function of the deviation that is ascertained, an offset value is ascertained which is suitable for influencing a predetermined instant for a commutation of the stator of the ECM during rotation of the rotor, in order to effect a symmetrization of the motor current.

Asymmetries in the motor current of an ECM can, in this fashion, be corrected while the motor is running. It is thus possible to dispense with complex methods for compensating for production tolerances after manufacture, and unfavorable boundary conditions and operating parameters can be compensated for simply and quickly. For example, instead of a usual balance weight insertion into a pocket of the rotor, faster and cheaper milled balancing can be used for the rotors of such ECMs, since even a less-than-optimal milling result is compensated for during operation of the ECM by the current symmetrization according to the present invention.

BRIEF FIGURE DESCRIPTION

Further details and advantageous refinement of the invention are evident from the exemplifying embodiments, in no way to be understood as a limitation of the invention, that are described below and depicted in the drawings, in which:

FIG. 1 is a simplified circuit diagram of an apparatus for symmetrizing the motor current of an ECM, according to a preferred embodiment of the invention;

FIG. 2 schematically depicts a method for commutating the ECM of FIG. 1, according to an embodiment of the invention;

FIG. 3A schematically depicts the motor current of the ECM of FIG. 1 in the context of a time-advanced commutation, but without symmetrization of the currents;

FIG. 3B schematically depicts the motor current of the ECM of FIG. 1 in the context of a commutation according to an embodiment of the invention, i.e. with symmetrized currents;

FIG. 4 is a flow chart of a method for symmetrizing the motor current of the ECM of FIG. 1, according to an embodiment of the invention;

FIG. 5 schematically depicts the execution of a method according to the present invention for symmetrizing the motor current of the ECM of FIG. 1, according to an embodiment of the invention;

DETAILED DESCRIPTION OF A PREFERRED EMBODIMENT

Figure 1:
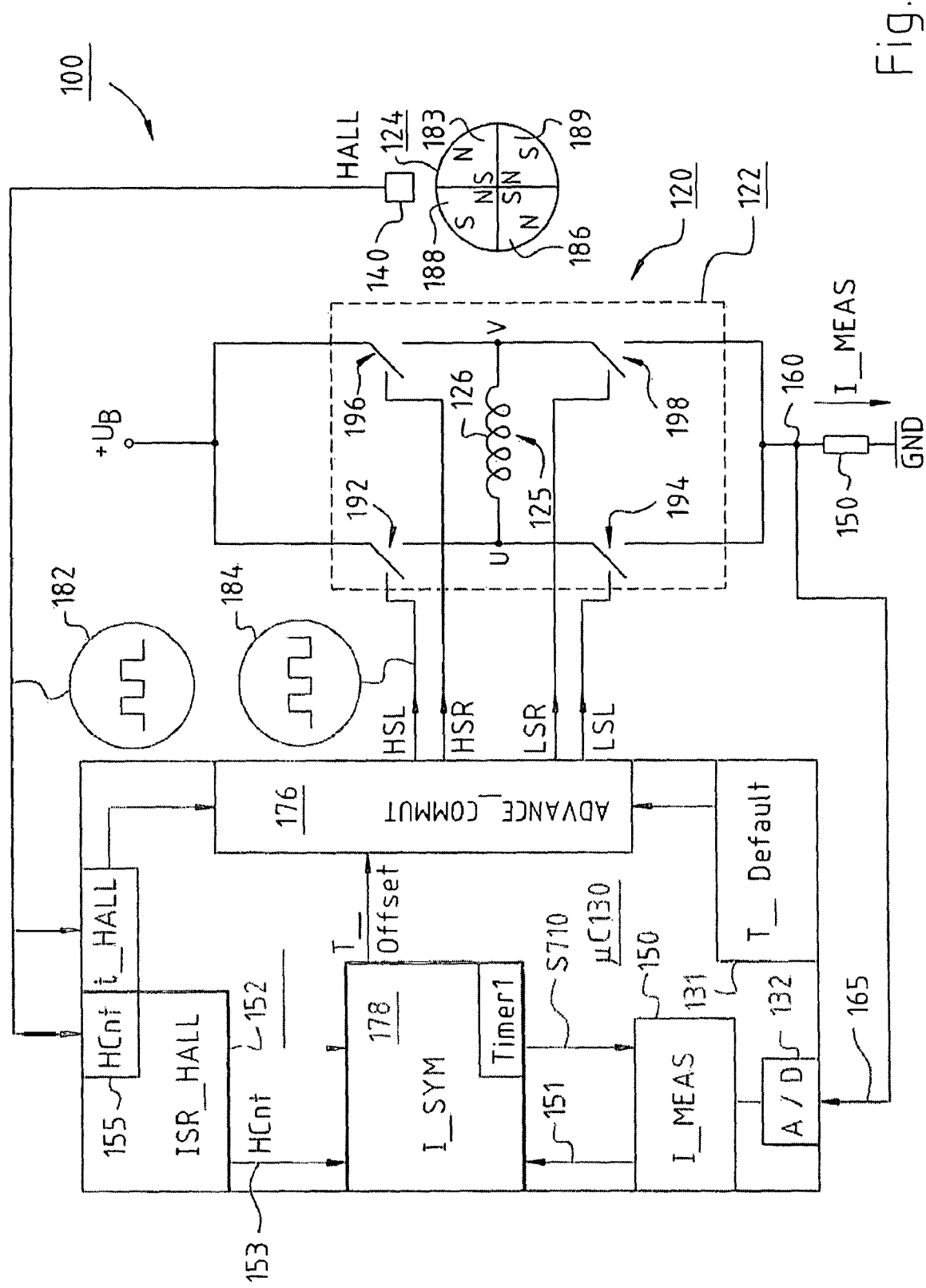

FIG. 1 is a simplified circuit diagram illustrating the working principle of an apparatus 100 for operating an ECM 120, in accordance with the present invention. Apparatus 100 is configured to bring about, by means of a suitable commutation of ECM 120, a symmetrization of the currents flowing in the motor, as depicted, for example, in FIG. 3A without symmetrization and in FIG. 3B with symmetrization.

ECM 120 has a rotor 124 and a stator 125 having at least one phase 126. Rotor 124 is depicted, by way of example, as a permanent-magnet rotor having two magnet-pole pairs, i.e. four magnet poles 183, 186, 188, 189. Alternatively, rotor 124 might be excited by the delivery of current, so that permanent magnets could be omitted. Stator 125 is depicted as a single-phase stator having a single phase 126. A different number of phases would also be possible. Phase 126 has two terminals U and V through which it is connected to power stage 122. A motor having an auxiliary reluctance torque is usually used as the single-phase motor, so that upon being switched on, the rotor is in a rotational position from which it can reliably start.

Power stage 122 serves to influence the motor current in phase 126 and is implemented, by way of example, as a full bridge circuit having four semiconductor switches 192, 194, 196, 198. Semiconductor switches 192, 194 are connected to terminal U of phase 126 and constitute a first half bridge. Terminal V of phase 126 is connected to semiconductor switches 196, 198, which constitute a second half bridge.

Power stage 122 is connected on the input side to a supply voltage +$U_B$. On the output side, power stage 122 is connected to a node 160. The latter is connected via a resistor 150 to ground (GND), and via a lead 165 to a controller 130 (μC). Resistor 150 serves to measure motor current I_MEAS. For that purpose, a voltage $U_{I\_MEAS}$ proportional to motor current I_MEAS is picked off at resistor 150 and delivered to an A/D converter 132 of controller 130, which ascertains therefrom a value for motor current I_MEAS.

Figure 2:
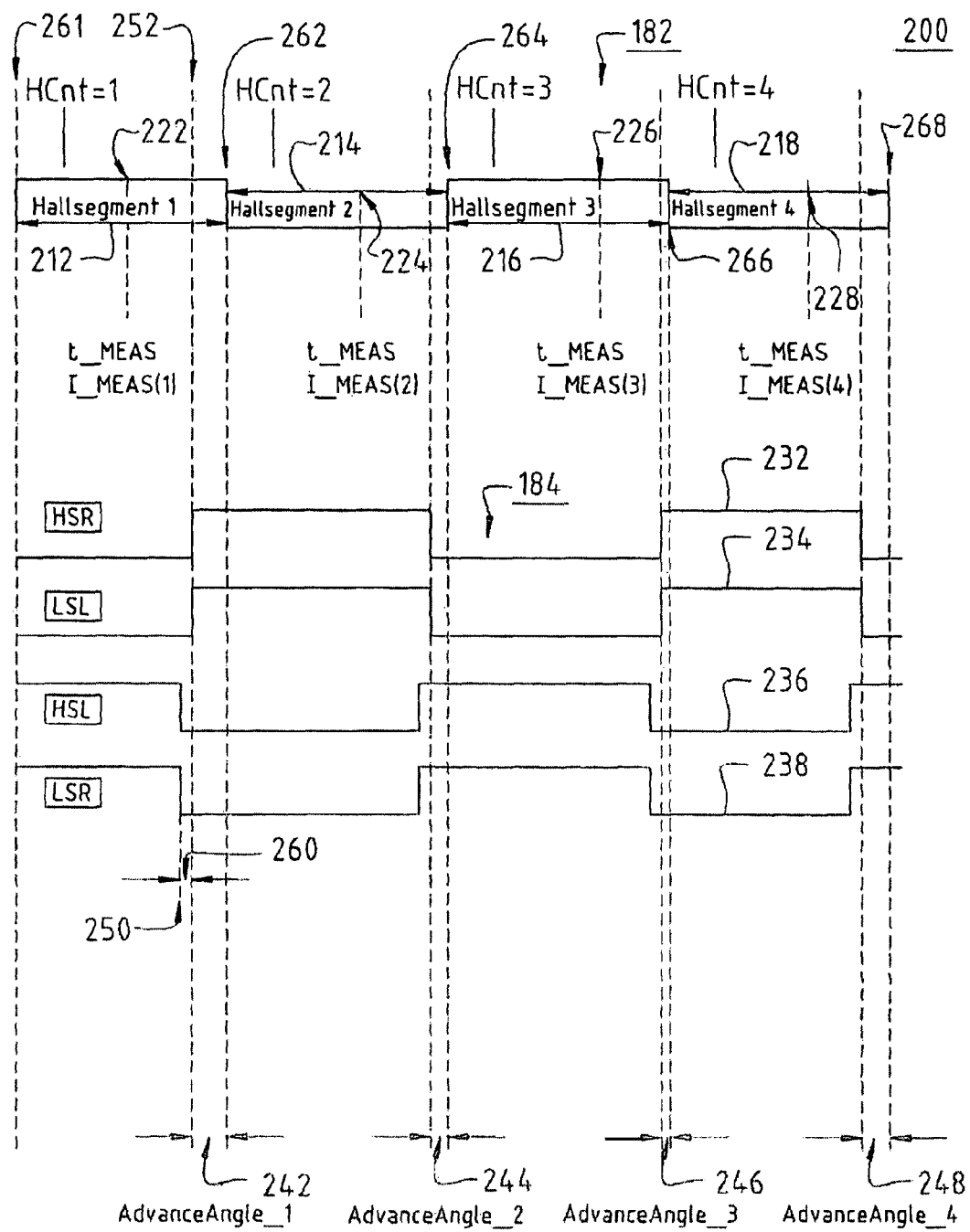

Controller 130 is connected on the input side to at least one rotor position sensor 140, and receives therefrom a rotor position signal 182 (HALL). Controller 130 generates commutation signals 184 (HSL, HSR, LSL, LSR) for power stage 122 as a function of rotor position signal 182. Commutation signals 184 are delivered to semiconductor switches 192, 194, 196, 198, where they control commutations. The latter are located respectively in the region of the locations at which rotor position sensor 140 senses a pole change of rotor magnet 124. In FIG. 2 these locations are labeled 261, 262, 266, 266. As is evident, commutation 252, for example, is located slightly before location 262 at which Hall signal 182 changes and thereby indicates a pole change, i.e. a specific rotational position of rotor 124.

According to a preferred embodiment of the invention, controller 130 is configured to generate commutation signals 184 for power stage 122 using a control routine 176 (ADVANCE_COMMUT), in such a way that a time-advanced commutation of ECM 120 is brought about at a so-called ignition angle that describes the phase position of the commutation. The "ignition angle" is understood to be the beginning of the commutation, which in the context of a time-advanced commutation is accomplished not at the instant of a change in the rotor position signal, but rather with a time offset therefrom. A default ignition angle is determined, for example in the context of a calibration of ECM 120, e.g. a self-calibration, and stored by controller 130 in a memory 131. (The term "ignition angle" is an illustrative term borrowed from automotive technology, although no "ignition" occurs in an electric motor.) In a motor 120 that has an approximately constant rotation speed during operation, this angle can be stored in the form of a default time T_Default.

For each commutation event of power stage 122, controller 130 uses a control routine 178 (I_SYM) to determine suitable offset values for individual modification of the ignition angle for each pole change. Commutation can thus be accomplished, at each change 261, 262, 264, 266 of rotor position signal 182 or each pole change at rotor position sensor 140, using a separate, individual ignition angle that was ascertained from the default ignition angle using an associated allocated offset value (cf. S810 in FIG. 8). This allows semiconductor switches 192 to 198 of power stage 122 to be controlled in such a way that symmetrization of the motor current is achieved by way of suitable switch-on and switch-off times, as shown by a comparison of FIG. 3A (without symmetrization) with FIG. 3B (with symmetrization).

As FIG. 1 shows, control unit 130 has a unit 150 with which an instantaneous value I_MEAS(HCnt) is measured, digitized, and delivered via a lead 151 to software module 178 (I_SYM).

Module 178 also receives from a module 152 (ISR_H-ALL), via a lead 153, a digitized signal HCnt that indicates the rotational position region in which rotor 124 is located.

In further explanation thereof: In the exemplifying embodiment, rotor magnet 124 has four poles 183, 186, 188, 189. When signal 182 indicates a North pole, this can therefore mean that either North pole 183 or North pole 186 is located opposite sensor 140.

In order to make the rotor position unequivocal for module 152, the latter has a counter 155 HCnt that, when the motor is running, continuously counts the poles of rotor 124 in the sequence (1)-(2)-(3)-(4)-(1)-(2)-(3)-(4)-(1) . . . , i.e. control unit 130 then knows that the measured current I_MEAS(1) is the current that was measured while rotor 124 is in region (1), and also that I_MEAS(2) is the current that was measured while rotor 124 is in region (2), etc. Expressed in general fashion, therefore: I_MEAS(HCnt) signifies the current that was measured while rotor 124 is in the present rotor region HCnt, i.e., for example, in region (4), and I_MEAS(HCnt−1) analogously signifies the current that was measured while the current was in the preceding rotor region (HCnt−1), i.e., for example, in region (3); because of the rotation of rotor 124, the regions are continuously cycled through during operation.

In the exemplifying embodiment, module 178 (I_SYM) receives two current signals that are designated I_MEAS(HCnt)

and

Figure 7:
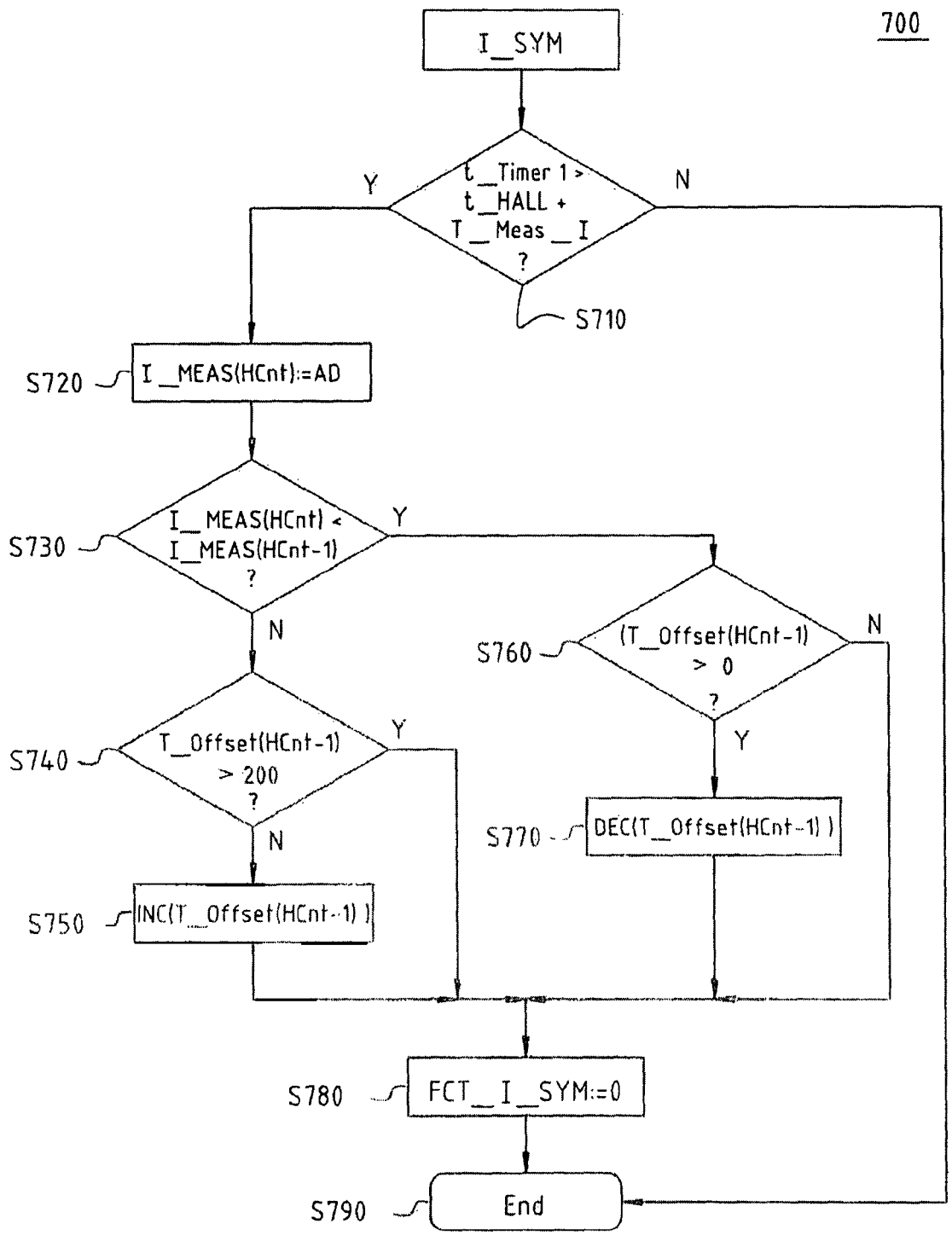
FIG. 7 is a flow chart of a method for determining a commutation offset, according to an embodiment of the invention.

I_MEAS(HCnt−1), i.e. the current that was measured in the present rotor region HCnt and the current that was measured in the preceding rotor region (HCnt−1). This is shown in FIG. 7 in steps S720 and S730, where these currents are continuously compared with one another. In an ideal motor, they should be of equal magnitude. In module 178 (I_SYM), the ignition angles for rotor region (1), for rotor region (2), for rotor region (3), and for rotor region (4) are continuously optimized in order to approach as closely as possible this ideal of equal-magnitude currents. This is described below. This optimization therefore takes place continuously in normal circumstances, i.e. if, for example, the temperature of the motor changes, the ignition angles for all four regions (1), (2), (3), and (4) also change, but the values for the ignition angles will differ from one another in normal circumstances in order to produce an optimized motor.

The manner of operation of apparatus 100 for commutating ECM 120 with individual ignition angles is described further with reference to FIG. 2.

FIG. 2 shows a diagram 200 of a method for commutating ECM 120, in accordance with a preferred embodiment of the invention. Diagram 200 shows, at the top, rotor position signal 182 generated by rotor position sensor 140, and in its lower part shows commutation signals 184 generated by controller 130, which are labeled ISR, LSL, HSL, and LSR in the same fashion as in FIG. 1. It is apparent that in this example, the commutation signals are phase-shifted to different extents with respect to rotor position signal 182, i.e. the phase shift is different for each Hall segment. The invention deals with optimization of these differing phase shifts.

Rotor position signal 182 is depicted for one complete mechanical revolution of rotor 124 having the four magnet poles 183, 186, 188, 189, and has four different regions 212, 214, 216, 218 characterized as Hall segments (1) to (4). Each of these regions 212, 214, 216, 218 is allocated by controller 130, using the HCnt variable, to a specific pole of rotor 124. As, described above, in this example rotor 124 has four poles. Therefore HCnt (Cnt mod 4)+1, where Cnt is a whole number such that Cnt≧0, which number is set to Cnt=0 upon startup of ECM 120 at an arbitrary rotational position of rotor 124, and is then incremented by 1 at each pole change during the operation of ECM 120. The variable HCnt can thus assume the integral values (1) to (4), so that at any instant during the operation of apparatus 100 of FIG. 1, rotor position signal 182 can be allocated to a specific pole.

As FIG. 2 shows, a first pole (HCnt=(1)) of rotor 124 is allocated to region 212, a second pole (HCnt=(2)) to region 214, a third pole (HCnt=(3)) to region 216, and a fourth pole (HCnt=(4)) to region 218. The first pole corresponds, for example, to pole 188, the second pole to pole 186, the third pole to pole 189, and the fourth pole to pole 183 of rotor 124 of FIG. 1. This allocation usually changes when the motor is switched off and switched back on.

Each of the commutation signals 184 (HSR, LSL, HSL, LSR) is depicted in FIG. 2 as a separate signal 232 to 238, which can assume the HIGH or LOW state. Signal 232 shows commutation signal HSR ("high side right") for controlling semiconductor switch 196. Signal 234 shows commutation signal LSL ("low side left") for controlling semiconductor switch 194. Signal 236 shows commutation signal HSL ("high side left") for controlling semiconductor switch 192. Signal 238 shows commutation signal LSR ("low side right") for controlling semiconductor switch 198.

For each commutation, commutation signals 232 to 238 are generated in such a way that those semiconductor switches 192 to 198 that are at present switched on, are switched off; and those semiconductor switches 192 to 198 that are presently switched off, are switched on.

For example, upon the transition from region 212 ("Hall segment 1") of the first pole (HCnt=(1)) to region 214 ("Hall segment 2") of the second pole (HCnt=(2)), firstly, at an instant 250, commutation signals 236 (HSL) and 238 (LSR) are set from HIGH to LOW. Semiconductor switches 192 and 198 are thereby switched off. After a so-called "commutation gap" or "dead time" 260, commutation signals 232 (HSR) and 234 (LSL) are then, at instant 252, set from LOW to HIGH. Semiconductor switches 196 and 194 are thereby switched on. Commutation gap 260 defines a minimum time span between the switch-on, and switch-off operations that are performed. This time span is necessary in order to prevent a bridge short circuit in power stage 122.

In the case in which a decay of the motor current is desirable, however, the commutation gap can also be selected to be sufficiently large to enable a "circulation" of current through phase 126 and the two semiconductor switches 194, 198, so that this current generates mechanical energy when its value decreases. With this alternative, the two semiconductor switches 192, 196 are then nonconductive during the commutation gap.

FIG. 2 shows that above a specific minimum rotation speed in the context of switchover operations of commutation signals 232 to 238, those semiconductor switches 192 to 198 that are switched on are not switched on at instants at which pole changes occur at rotor position sensor 140. (These instants are labeled 261, 262, 264, 266, 268). Instead, the switching-on operations are performed with a time advance, i.e., as explained, a time-advanced commutation occurs.

For example, upon the pole change from the first pole (HCnt=1) to the second pole (HCnt=2), commutation signals 232 (HSR) and 234 (LSL) are switched over from LOW to HIGH not at instant 262 of the pole change, but instead already at a earlier instant 252 that precedes that instant 262 by an amount equal to an ignition angle 242 (AdvanceAngle_1). This ignition angle 242 is determined individually for this pole change, as explained in the context of FIGS. 4 to 8. By analogy therewith, an individual ignition angle is determined for each pole change. According to FIG. 2, an ignition angle 244 (AdvanceAngle_2) is determined for the pole change from the second pole (HCnt=2) to the third pole (HCnt=3), an ignition angle 246 (AdvanceAngle_3) for the pole change from the third pole (HCnt=3) to the fourth pole (HCnt=4), and an ignition angle 248 (AdvanceAngle_4) for the pole change from the fourth pole (HCnt=4) back to the first pole (HCnt=1).

The individual ignition angles 242 to 248, which are each made up of a default ignition angle and an individual offset value, have in FIG. 2, by way of example, different lengths or durations achieved by way of different offset values, and serve (as mentioned above) to symmetrize the motor current and to equalize its amplitude.

In order to determine whether the motor current is or is becoming substantially symmetrical, motor current I_MEAS is measured in each case after a predetermined time span after a change in the rotor position signal, i.e. after each pole change at rotor position sensor 140. The following values are accordingly measured:

for the first pole (HCnt=1) at instant 222, a motor current I_MEAS(1);

for the second pole (HCnt=2) at instant 224, a motor current I_MEAS(2);

for the third pole (HCnt=3) at instant 226, a motor current I_MEAS(3);

for the fourth pole (HCnt=4) at instant 228, a motor current I_MEAS(4).

Figure 5:
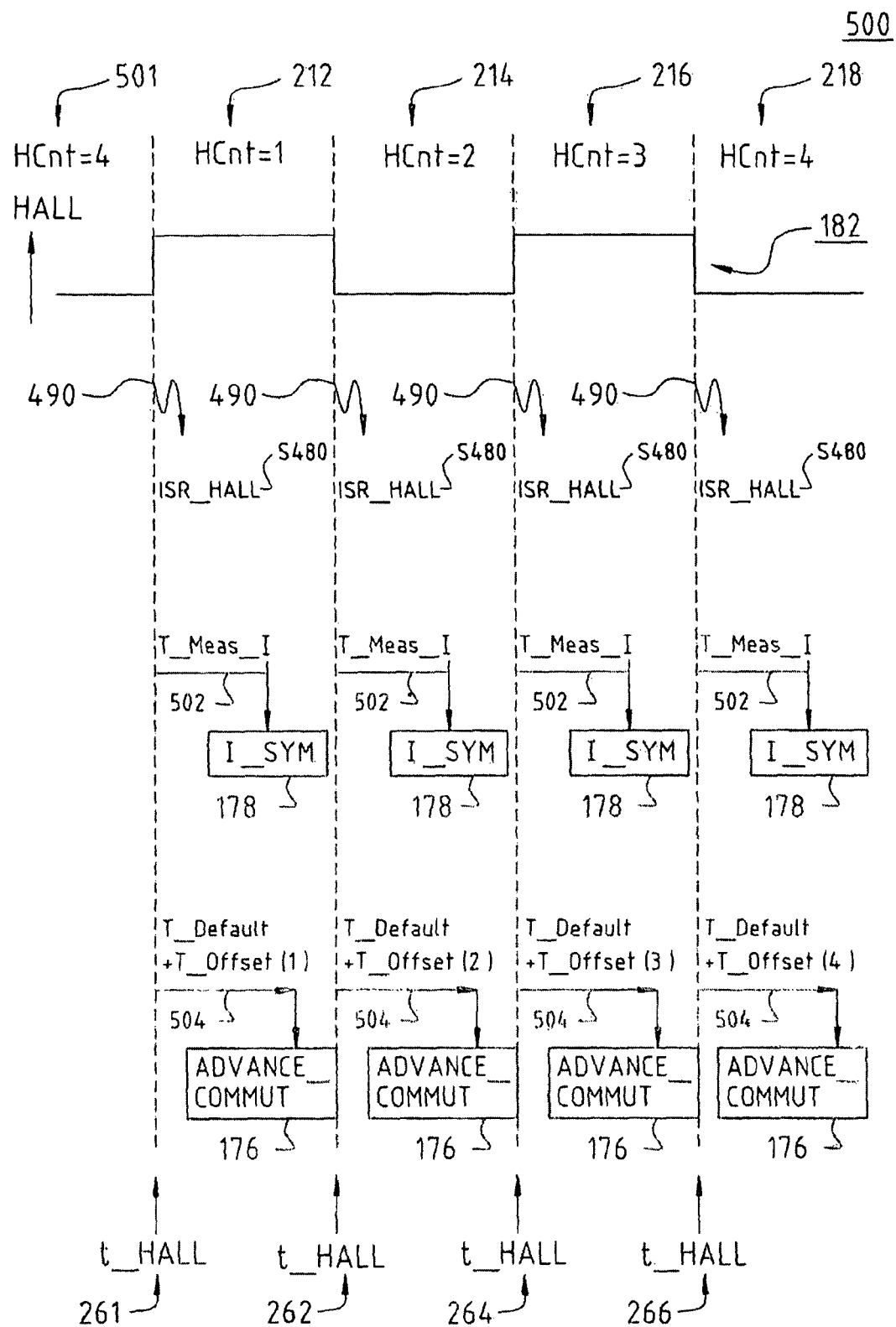

Current I_MEAS is measured when a predetermined time span T_MEAS_I has elapsed since a change 261, 262, 264, 266 in rotor position signal 182 (cf. FIG. 5, where this time span is labeled 502).

Each measured motor current is compared with the previously measured motor current in order to ascertain a deviation therefrom. For example, motor current I_MEAS(2) his compared with motor current I_MEAS(1) in order to determine a deviation $$A(1)=I\_MEAS(2)-I\_MEAS(1) \qquad (1).$$

Motor current I_MEAS(3) is compared with motor current I_MEAS(2) in order to determine a deviation $$A(2)=I\_MEAS(3)-I\_MEAS(2) \qquad (2),$$

and so forth.

This comparison takes place in control routine I_SYM (FIG. 7), and the comparison is shown there in step S730. Depending on the result of the comparison, either the time T_Offset (HCnt) is increased by a predetermined value in step S750, or it is decreased by a predetermined value in step S770.

The fact that a deviation Λ(n) was ascertained thus causes the offset value of a corresponding individual, ignition angle to be aligned, i.e. adjusted. An amplitude equalization that has already been achieved is automatically taken into consideration. Preferably the offset value of ignition angle 242 is adapted using deviation A(1), the offset value of ignition angle 244 using deviation A(2), etc. The determination of suitable offset values and of the individual ignition angles 242 to 248 is described in detail with reference to FIGS. 4 to 8.

Figure 3A:
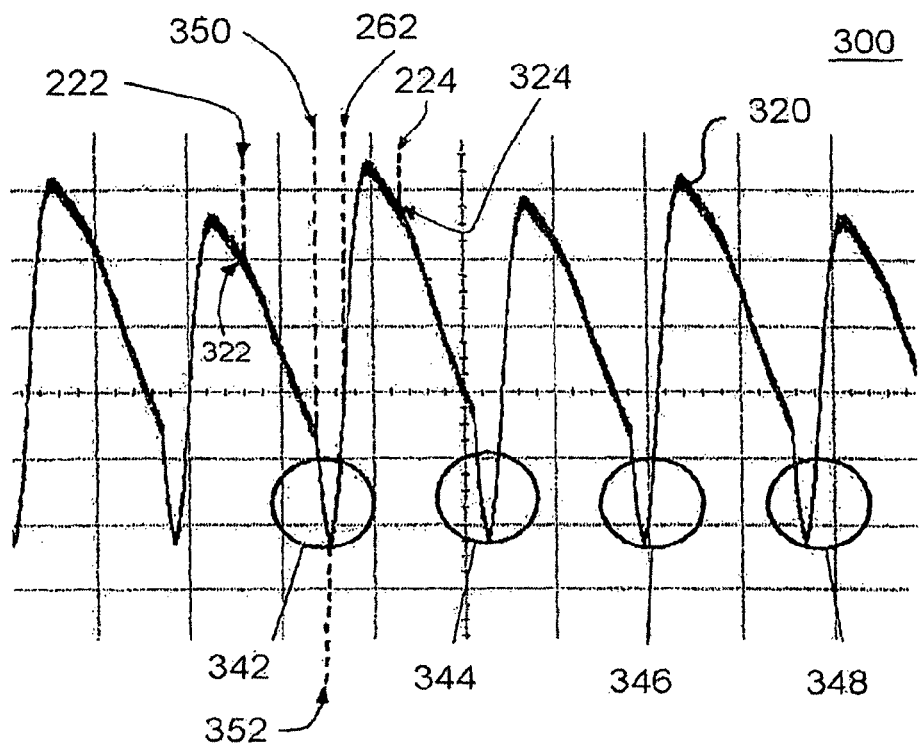

FIG. 3A provides a depiction 300 of an exemplifying profile of a motor current 320 that was measured during the operation of ECM 120 in the context of a time-advanced commutation without symmetrization of the currents. This time-advanced commutation was carried out using a default ignition angle that is used at the beginning of current symmetrization, at all pole changes, as ignition angle 342, 344, 346, 348, since all the offset values are set to zero at the beginning of the time-advanced commutation.

In the context of the time-advanced commutation, at instant 350 (FIG. 3A), for example, semiconductor switches 192, 198 of power stage 122 are switched off, and at instant 352 semiconductor switches 194, 196 are switched on. At instant 262 a pole change, for example the pole change from the first pole (HCnt=1) to the second pole (HCnt=2) according to FIG. 2, is then sensed by way of a change in rotor position signal 182.

When the default ignition angle is used for uniform time-advanced commutation, however, asymmetries occur in motor current 320, as shown by FIG. 3A.

As described, current symmetrization requires the measurement of instantaneous values for motor current 320. At instant 222 (FIG. 3A) an instantaneous value 322, representing motor current I_MEAS(1), is therefore measured for motor current 320. Analogously thereto, at instant 224 an instantaneous value 324 representing motor current I_MEAS(2) is determined, and so forth. As FIG. 3A shows, in this example instantaneous value 324 is greater than instantaneous value 322. It is thus possible to identify a deviation that is greater than zero and results in a change in the corresponding offset value for the ignition angle, as will be described below. Ignition angle 342 can then, as described with reference to FIG. 2, be individualized for each pole change by means of a respectively allocated offset value.

Figure 3B:
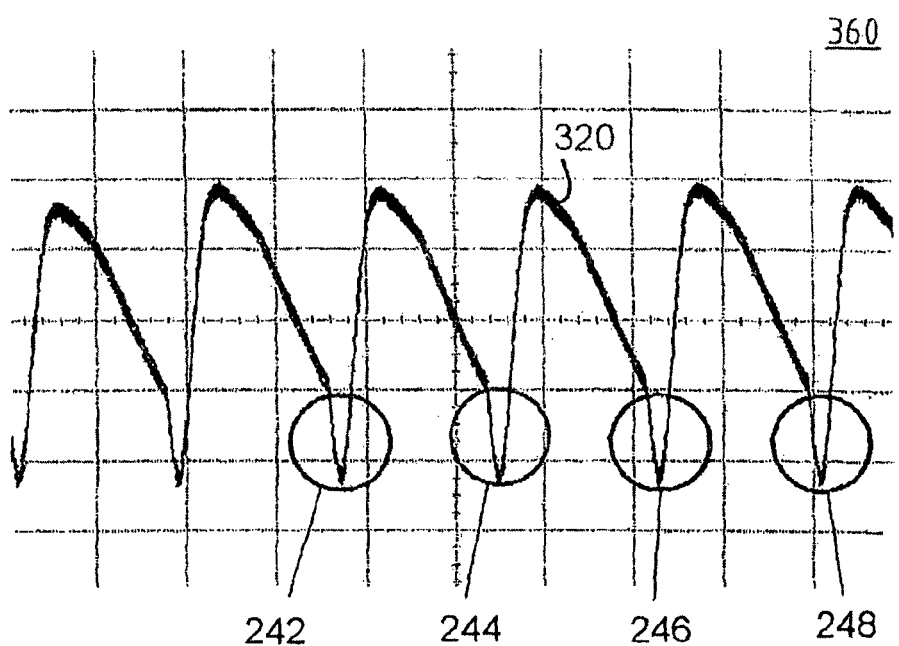

FIG. 3B provides a depiction 360 of an exemplifying profile of motor current 320 in the context of a time-advanced commutation of ECM 120 using individual ignition angles 242, 244, 246, 248 of FIG. 2. As is evident from FIG. 3B, with this type of commutation motor current 320 is substantially symmetrical, for example in terms of amplitude and/or shape. This results in quieter motor running and higher efficiency.

Figure 4:
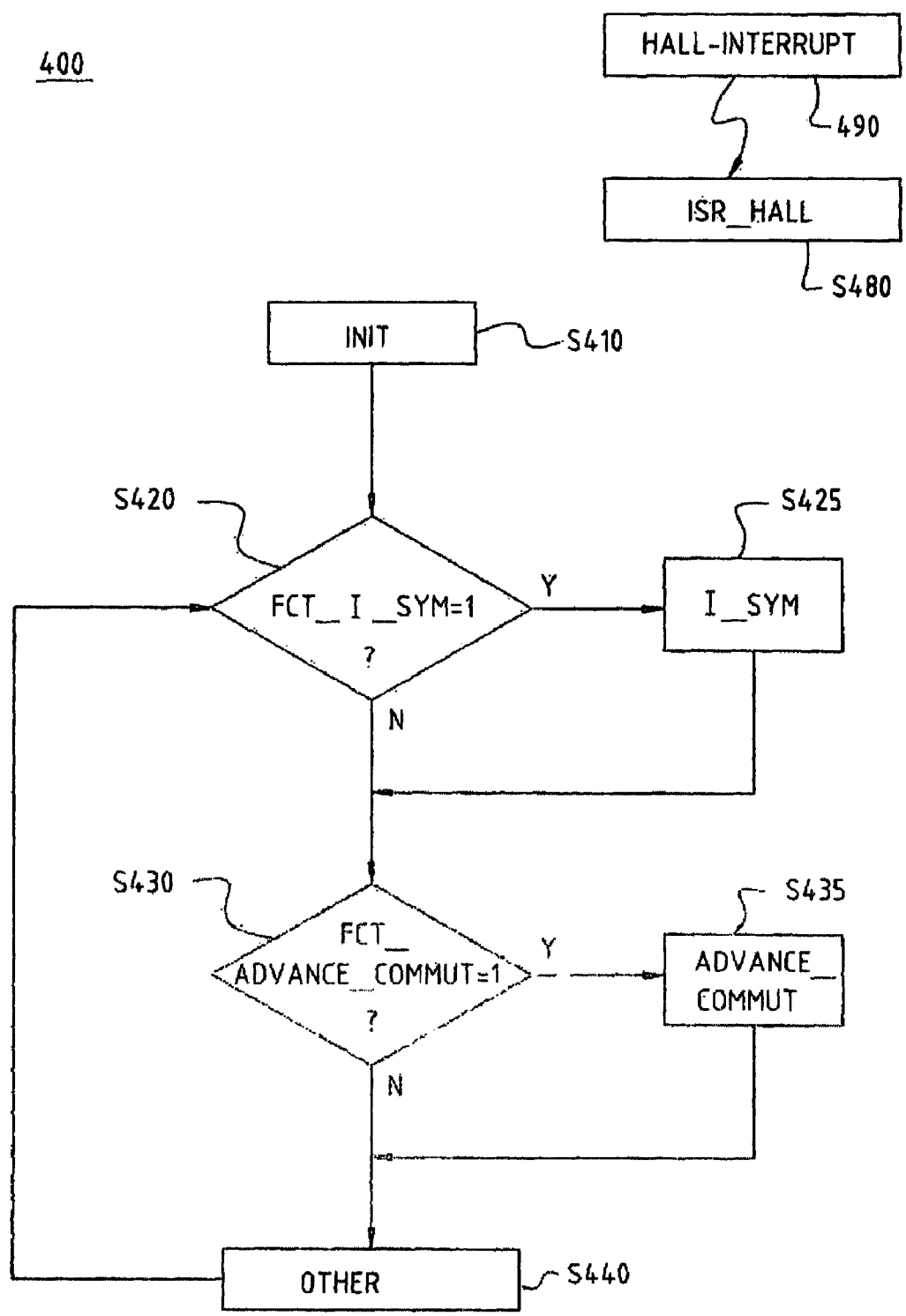

FIG. 4 is a flow chart of a method 400 according to the present invention for commutating ECM 120, which method is carried out by controller 130 of FIG. 1. Method 400 (FIG. 4) is preferably carried out as the main program of controller 130, in the form of an endless loop whose execution begins upon startup of ECM 120 after an initialization, and ends again only when operation is interrupted or terminated. Initialization of the endless loop is accomplished in step S410, controller 130 and its inputs and output, e.g. A/D converter 132, being initialized.

Step S420 checks whether a function bit FCT_I_SYM is set, i.e. whether FCT_I_SYM=1. If so, a current symmetrization of the motor current is requested. In this case the main program calls, in step S425, control routine I_SYM 178 of FIG. 1. An exemplifying control routine I_SYM is described with reference to FIG. 7. If FCT_I_SYM=0, i.e. if this function bit is not set, current symmetrization is not requested and the main program continues in step S430. This is the case at low rotation speeds.

Step S430 checks whether a function bit FCT_ADVANCE_COMMUT is set. If FCT_ADVANCE_COMMUT=1, a time-advanced commutation of the motor current is requested. In this case the main program calls, in step S435, control routine ADVANCE_COMMUT 176 of FIG. 1. An exemplifying ADVANCE_COMMUT control routine is described with reference to FIG. 8. If FCT_ADVANCE_COMMUT=0, i.e. if this function bit is not set, time-advanced commutation is not requested and the main program continues in step S440.

In step S440 other necessary control routines are executed, e.g. an I/O routine, an alarm routine, or a 250-ms routine. The latter is a function that is called every 250 ms. If the motor is stalled, this routine determines how long current will be delivered to ECM 120 in order to attempt a restart, and how long the current will then be switched off if the starting attempt was not successful. The main program then returns to step S420.

The endless loop executed by the main program (FIG. 4) is interrupted, at each change in rotor position signal 182 of FIG. 1 or FIG. 2, i.e. at each pole change at rotor position sensor 140, by an interrupt service routine in step S480 (ISR_HALL). ISR_HALL is triggered by an interrupt signal 490 (HALL-INTERRUPT) that is generated, for example, at each change in rotor position signal 182. An exemplifying interrupt service routine ISR_HALL is described with reference to FIG. 6.

An example of a commutation sequence according to the present invention using the main program is described in FIG. 5.

FIG. 5 shows a diagram 500 that illustrates the sequence of main program 400 of FIG. 4 in apparatus 100 (FIG. 1), according to an embodiment of the invention. Chart 500 contains rotor position signal 182 of FIG. 2 with the four Hall segments 212, 214, 216, 218 that begin at instants 261, 262, 264, and 266, respectively. Proceeding from instants 261, 262, 264, 266, an individual commutation instant is determined with reference to each pole change of rotor 124 of ECM 120, as will be described below in detail.

As FIG. 5 shows, at the transition from Hall segment 501 to Hall segment 212 at instant 261, a first change in rotor position signal 182 is sensed, which change is brought about by a pole change from the fourth pole (HCnt=4) to the first pole (HCnt=1). At this pole change, instant 261 is assigned to a time variable t_HALL, and HALL-INTERRUPT signal 490 is generated, thereby triggering interrupt service routine ISR_HALL in accordance with step S480 of FIG. 4.

In ISR_HALL (FIG. 6), function bit FCT_I_SYM is set in S670, and function bit FCT_ADVANCE_COMMUT is set to 1 in S680 when, in accordance with S640, the rotation speed of rotor 124 exceeds a predetermined minimum rotation speed or a lower rotation speed limit that, depending on the motor, is e.g. 450 rpm. An exemplifying interrupt service routine ISR_HALL is described with reference to FIG. 6.

For the remainder of the description of chart 500, it is assumed that the rotation speed of rotor 124 at instant 261 is above the lower rotation speed limit, and that function bits FCT_I_SYM and FCT_ADVANCE_COMMUT in ISR_HALL are thus set to 1. Accordingly, after ISR_HALL has been carried out, control routine 178 (I_SYM) is called in accordance with step S425 of main program 400 (FIG. 4), and control routine 116 (ADVANCE_COMMUT) is called in accordance with step S435.

Control routine 178 (I_SYM) is called, proceeding from instant t_HALL, after a predetermined waiting time 502

(T_Meas_I) has elapsed. An exemplifying control routine I_SYM is described with reference to FIG. 7. In this routine 178, the instantaneous current I_MEAS(HCnt) is measured and digitized in step S720.

Control routine 176 (ADVANCE_COMMUT) is called, likewise proceeding from instant t_HALL, after a predetermined time span 504 (T_Default+T_Offset(1)) has elapsed. T_Default is a default value for setting the ignition angle for time-advanced commutation, and T_Offset(1) is a commutation offset for individualizing the default value for the pole change from the first pole (HCnt=1) to the second pole (HCnt=2). (The value T_Offset(1) is calculated before instant 260 is reached.) An exemplifying control routine ADVANCE_COMMUT is described with reference to FIG. 8.

The sequence described with reference to first Hall segment 212 is then repeated for each of the Hall segments 214, 216, 218. Instant 262 is assigned to variable t_HALL at the beginning of second Hall segment 214, instant 264 at the beginning of third Hall segment 216, and instant 266 at the beginning of fourth Hall segment 218. Predetermined time span 504 is defined in second Hall segment 214 by T_Default+T_Offset(2), in third Hall segment 216 by T_Default+T_Offset(3), and in fourth Hall segment 218 by T_Default+T_Offset(4); the corresponding T_Offset value defines, in each case, a commutation offset for individualizing the default value for a corresponding pole change.

As FIG. 5 shows, the individual commutation offsets are updated after each mechanical revolution of rotor 124. The instant of time-advanced commutation for each pole change is thus updated after each revolution of rotor 124 as a function of a previously achieved amplitude equalization of the motor current in the energization phases of motor phase 126. This makes possible an iterative symmetrization of the motor current in the individual rotation angle ranges (cf. FIG. 3B), and thus an improvement in the efficiency of ECM 120.

Figure 6:
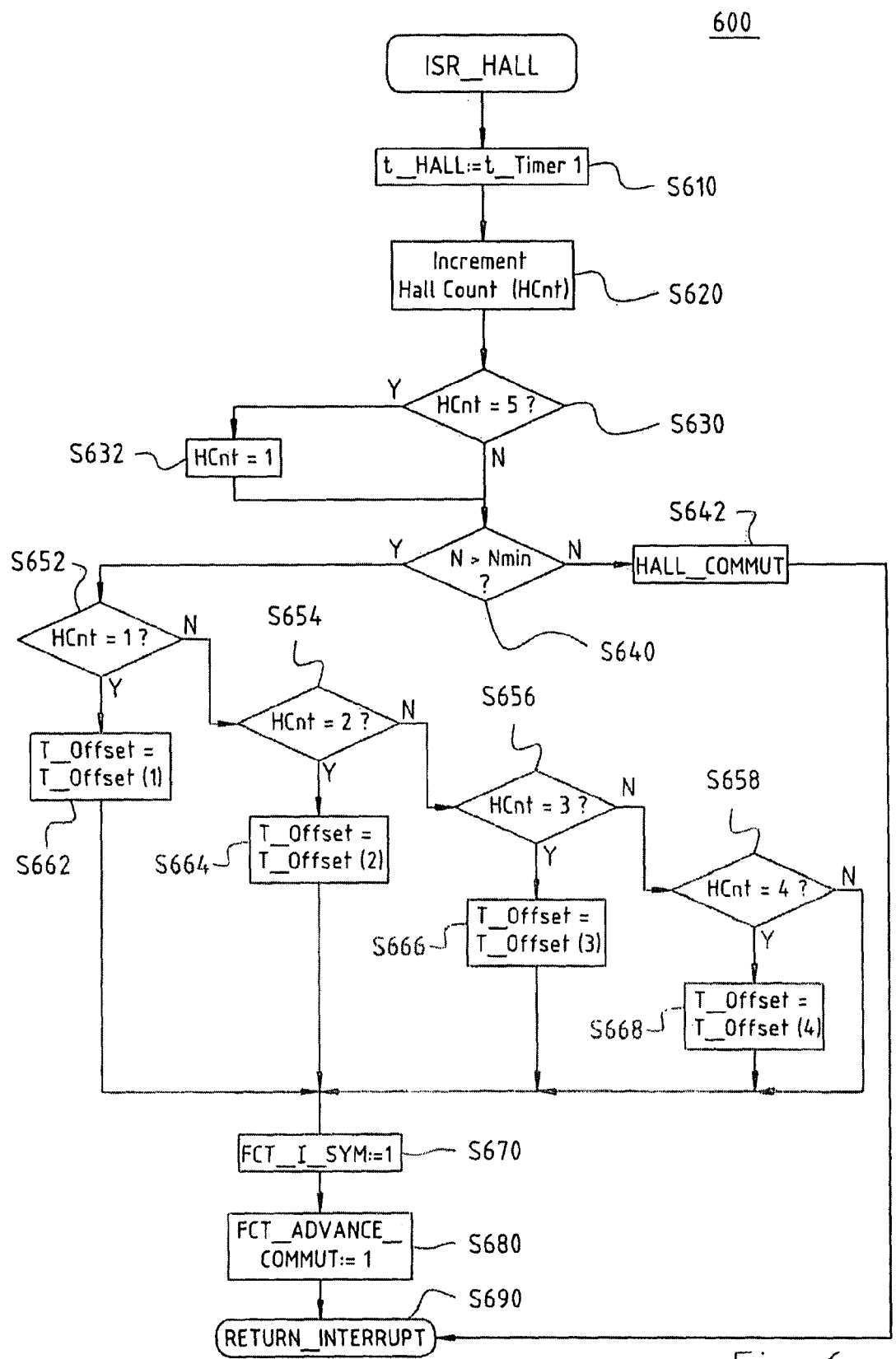
FIG. 6 is a flow chart of a method for carrying out an interrupt service routine, according to an embodiment of the invention.

FIG. 6 is a flow chart of a method 600 with which the interrupt service routine (ISR_HALL) that is executed in step S480 of FIG. 4 is realized, in accordance with a preferred embodiment of the invention.

The ISR_HALL routine begins with step S610, in which a present instant or instantaneous time value t_Timer1 is determined. The value t_Timer1 is a time variable that is always defined by an instantaneous time value. This instantaneous time value can be ascertained, for example, using a timer that is realized by controller 130 of FIG. 1. The instantaneous time value t_Timer1 ascertained at the beginning of the execution of ISR_HALL is assigned in step S610 to the variable t_HALL. For example, in the case in which instant 261 according to FIG. 5 is determined as instantaneous time value t_Timer1, that instant 261 is assigned to variable t_HALL.

In step S620 the value HCnt of a Hall segment counter, which counter is realized e.g. by controller 130 (FIG. 1), is incremented. The value HCnt of the Hall segment counter serves to allocate, to a corresponding pole of rotor 124 of FIG. 1, a Hall segment sensed at the beginning of the execution of ISR_HALL. For example, at instant 261 of FIG. 5 the pole change from the fourth pole to the first pole of rotor 124 occurs. Therefore, HCnt=4 before the pole change, and is accordingly incremented in step S620 from HCnt=4 to HCnt=5.

In the exemplifying embodiment depicted in FIGS. 1 to 5, it is assumed that rotor 124 has four poles, i.e. that it has four magnet poles 183, 186, 188, 189. Because a specific Hall segment is assigned to each pole, HCnt in the above example can assume only integral values from 1 to 4. Step S630 therefore checks whether HCnt=5. If HCnt is less than 5, ISR_H-

ALL continues in step S640. Because HCnt=5 in the present example, in step S632 HCnt is set to HCnt=1 before ISR_H-ALL continues in step S640. This takes into account the fact that the present Hall segment is being generated by sensing of the first pole at rotor position sensor 140 of FIG. 1. The result, accordingly, is that at the next commutation of the motor current, the pole change takes place from the first pole to the second pole. The instant of this next commutation is defined, according to FIG. 5, by predetermined time span 504 in first Hall segment 212; i.e. by T_Default+T_Offset(1).

Step S640 determines whether rotation speed N of rotor 124 is below the lower rotation speed limit Nmin. If N<Nmin, the next commutation of the motor current in phase 126 of FIG. 1 is carried out in step S642 in the usual manner, i.e. a time-advanced commutation does not occur, but instead the commutation is controlled directly by Hall signal 182. If it is already the case that N>Nmin, at the next commutation a time-advanced commutation is performed with an individual ignition angle, and ISR_HALL continues in step S652.

Step S652 checks whether HCnt=1. If HCnt=1, ISR_H-ALL continues in step S662. Otherwise step S654 checks whether HCnt=2. If HCnt=2 in step S654, ISR_HALL continues in step S664. Otherwise step S656 checks whether HCnt=3. If so, ISR_HALL continues in step S666. Otherwise step S658 checks whether HCnt=4. If it is determined in step S658 that HCnt=4, ISR_HALL continues in step S668.

In step S662, the value of commutation offset T_Offset(1) is assigned to a commutation offset T_Offset in order to influence the default value T_Default, to produce an individual change in the instant of time-advanced commutation before the pole change from the first pole to the second pole, which according to FIG. 5 occurs at instant 262. In step S664 the value assigned to T_Offset is T_Offset(2), with which the instant of time-advanced commutation before the pole change from the second pole to the third pole, which according to FIG. 5 occurs at instant 264, is individualized. In step S666 the value assigned to T_Offset is T_Offset(3), with which the instant of time-advanced commutation before the pole change from the third pole to the fourth pole, which according to FIG. 5 occurs at instant 266, is individualized. In step S668 the value assigned to T_Offset is T_Offset(4), with which the instant of time-advanced commutation before the pole change from the fourth pole to the first pole, which according to FIG. 5 occurs at instant 261, is individualized.

In step S670 the function bit FCT_I_SYM is set to 1 in order to cause the main program of FIG. 4 to execute, in step S425, the control routine I_SYM, in order to update the respective assigned commutation offset for the default value of the ignition angle. An exemplifying control routine I_SYM is described with reference to FIG. 1.

In step S680 the function bit FCT_ADVANCE_COMMUT is set to 1 in order to cause the main program of FIG. 4 to execute, in step S435, the ADVANCE_COMMUT control routine in order to cause the time-advanced commutation with the respectively ascertained individual ignition angle. An exemplifying ADVANCE_COMMUT control routine is described with reference to FIG. 8.

ISR_HALL (FIG. 6) is then terminated in step S690, and execution of the main program of FIG. 4 is resumed.

FIG. 7 is a flow chart of a method 700 with which control routine 178 (I_SYM) of FIG. 1 is realized according to a preferred embodiment of the invention. As described in FIG. 4, this control routine I_SYM is executed in step S425 of the main program of FIG. 1 when function bit FCT_I_SYM is set to 1.

Control routine I_SYM begins with step S710, in which (as described above with reference to FIG. 6) a present instant or instantaneous time value for variable t_Timer1 is determined, and is compared with a time value that is constituted by t_HALL and the predetermined waiting time T_Meas_I (FIG. 5). Step S710 thus checks whether, in a predetermined Hall segment HCnt, the predetermined waiting time T_Meas_I since the pole change at instant t_HALL at the beginning of that Hall segment HCnt has elapsed. If the predetermined waiting time T_Meas_I has not yet elapsed (i.e. if t_Timer1≦t_Hall−T Meas_I), the control routine ends in step S790. Otherwise the control routine continues in step S720.

In step S720, as described with reference to FIG. 1, a measurement of motor current I_MEAS is carried out. This involves ascertaining motor current I_MEAS(HCnt) for the present Hall segment HCnt, i.e., for example, motor current I_MEAS(1) for Hall segment 1, if that is the present one.

In step S730, motor current I_MEAS(HCnt) measured in the present Hall segment HCnt is compared with motor current I_MEAS(HCnt−1) measured in the previously sensed Hall segment HCnt−1. What is determined here is a deviation of motor current I_MEAS(HCnt) from motor current I_MEAS(HCnt−1). If that deviation is less than zero, i.e. if I_MEAS(HCnt)<I_MEAS(HCnt−1), control routine I_SYM continues in step S760. Otherwise it continues in step S740.

Step S760 determines whether commutation offset T_Offset(HCnt−1) is greater than a predetermined lower limit value (in this case, zero). This lower limit value can be predetermined in application-specific fashion. If commutation offset T_Offset(HCnt−1) is greater than the lower limit value, in step S770 T_Offset(HCnt−1) is decremented preferably by a value of 1, before control routine I_SYM continues in step S780. Otherwise no decrementing of the commutation offset is carried out, so that after step S760, control routine I_SYM continues in step S780. It is thus possible to prevent commutation offset T_Offset(HCnt−1) from falling below the lower limit value as a result of the decrementing in step S770 (underflow prevention).

Step S740 checks whether commutation offset T_Offset(HCnt−1) is greater than a predetermined upper limit value. This upper limit value can be predetermined in application-specific fashion, and in FIG. 7 is set, by way of example, to 200. If commutation offset T_Offset(HCnt−1) is not greater than the upper limit value (i.e. if T_Offset(HCnt−1)≦200), in step S750 T_Offset(HCnt−1) is incremented preferably by a value of 1, before control routine I_SYM continues in step S780. Otherwise no increment of the commutation offset is carried out, so that after step S740, control routine I_SYM continues in S180. This prevents the upper limit value for commutation offset T_Offset(HCnt−1) from being exceeded as a result of an incrementing in step S750, which would cause an overflow. Limiting the commutation offset at the top and bottom ensures that it does not assume any unsuitable values.

In step S780, function bit FCT_I_SYM is reset to zero; control routine I_SYM of FIG. 7 then ends in step S790, and the main program of FIG. 4 continues at step S430 as described above. The fact that FCT_I_SYM is reset in S780 prevents control routine I_SYM from being called again by the main program (FIG. 4) before the next execution of ISR_HALL (FIG. 6). This therefore prevents a second or further incrementing or decrementing of the same commutation offset within a single Hall segment, i.e. before the occurrence of a subsequent pole change.

Be it noted that in control routine I_SYM (FIG. 7), as described, commutation offset T_Offset(HCnt−1) is updated in the present Hall segment HCnt. This commutation offset serves to individualize the ignition angle in the context of a pole change from Hall segment HCnt−1 to Hall segment HCnt. The updated commutation offset T_Offset(HCnt−1) is accordingly used only after one essentially complete mechanical revolution of rotor 124, for individualization of the ignition angle upon time-advanced commutation before the next occurrence of that pole, change.

Figure 8:
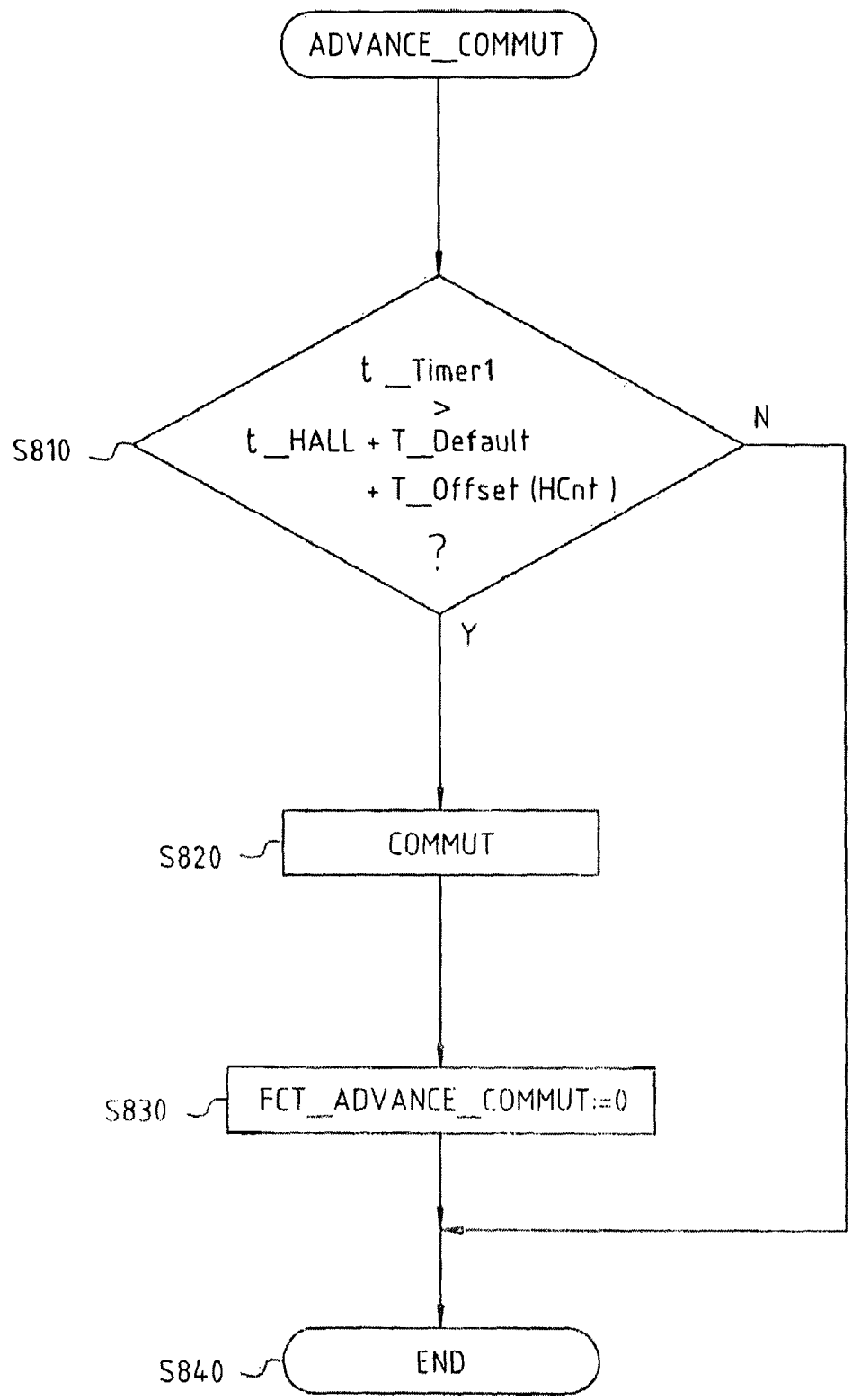
FIG. 8 is a flow chart of a method for carrying out a time-advanced commutation, according to an embodiment of the invention.

FIG. 8 is a flow chart of a method 800 with which control routine 176 (ADVANCE_COMMUT) of FIG. 1 is realized according to a preferred embodiment of the invention. As described above with reference to FIG. 4, this ADVANCE_COMMUT control routine is preferably executed in step S435 of the main program (FIG. 4) when function bit FCT_ADVANCE_COMMUT=1.

The ADVANCE_COMMUT routine begins with step S810 in which, as described with reference to FIG. 6, a present instant or an instantaneous Lime value is determined for variable t_Timer1, and is compared with a time value that is constituted by t_HALL, the default value T_Default for the ignition angle for time-advanced commutation, and commutation offset T_Offset(HCnt). Step S810 thus checks whether, in a corresponding Hall segment HCnt, the predetermined time span T_Default+T_Offset(HCnt) since the pole change at instant t_HALL at the beginning of that Hall segment HCnt has elapsed (time-advanced commutation occurs at the end of this time span). If the predetermined time span has not yet elapsed (i.e. if t_Timer1≦HALL+T_Default+T_Offset (HCnt)), the ADVANCE_COMMUT routine ends in step S840. Otherwise the routine continues in step S820.

In step S820 the motor current in phase 126 is commutated, as described above with reference to FIG. 2. In step S830 the function bit FCT_ADVANCE_COMMUT is then reset to FCT_ADVANCE_COMMUT=0; the ADVANCE_COMMUT control routine then ends in step S840, and the main program of FIG. 4 continues, as described above, at step S440. The fact that FCT_ADVANCE_COMMUT is reset in step S830 prevents the main program (FIG. 4) from calling the ADVANCE_COMMUT control routine again until the next execution of the ISR_HALL routine (FIG. 6). This prevents a second or further commutation within a single fall segment, i.e. before the next pole change occurs.

According to the present invention, asymmetries in the motor current of ECM 120 can be compensated for, during operation, by the use of suitable individual ignition angles having corresponding individual commutation offsets, thereby quickly and easily compensating for unfavorable boundary conditions and operating parameters.

The stepwise incrementing/decrementing of these individual commutation offsets results in a continuous amplitude equalization of the motor current in different energization phases, i.e. this procedure extends, if applicable, over a large number of revolutions of rotor 124, in particular after motor 120 is switched on.

Many variants and modifications are of course possible within the scope of the present invention.

For example, the calling of routine I_SYM 178 (FIG. 7) after time T_Meas_I and/or the calling of the ADVANCE_COMMUT routine (FIG. 8) after time T_Default+T_Offset (HCnt) can be controlled by a timer set to the corresponding time, and if applicable by a timer interrupt triggered by the timer. This eliminates repeated checking (polling) as to whether the corresponding time has already elapsed (S710 in FIG. 7 and S810 in FIG. 8).

Instead of the addition of an individualizing value T_Offset (HCnt) to a basic value T_Default, it is also possible to use a variable T_Commut(HCnt) for each rotor pole, all the T_Commut(HCnt) values being set upon initialization to, for example, the value T_Default. Symmetrization is then accomplished by adapting the respective T_Commut(HCnt) values.

These and similar modifications are within the scope of activity of one having ordinary skill in the art.

The invention claimed is:

1. A method of commutating an electronically commutated motor (120), which motor comprises a rotor (124), at least one phase (126), a power stage (122) for influencing a motor current (320) flowing through the at least one phase (126), a memory (131) adapted for storing a default time span value (T_Default), and a rotor position sensor (140) for generating a rotor position signal (182), which method comprises the following steps:
    A) after a change of the rotor position signal (182), which change is associated with a pole change that follows a commutation of the motor current (320) through the at least one phase (126) and that is referred to hereinafter as a first pole change, ascertaining a first value (I_MEAS(HCnt−1)) of the motor current;
    B) after a predetermined time span (T_Default+T_Offset(HCnt−1)) has elapsed since the first pole change, carrying out a new commutation;
    C) after a change of the rotor position signal (182), which change follows the new commutation and is associated with a pole change that is hereinafter referred to as a second pole change, ascertaining a second value for the motor current (I_MEAS(HCnt));
    D) ascertaining any deviation between the first value (I_MEAS(HCnt−1)) and second value (I_MEAS(HCnt)), and as a function of said deviation, modifying the value for the predetermined time span (T_Default+T_Offset(HCnt−1)) in order to bring about, when this modified value is applied during commutation control,
an improved equalization of the first value for the motor current and the second value for the motor current.

2. The method according to claim 1,
    wherein after a minimum rotation speed (Nmin) of the motor is reached, steps A) to D) are continuously repeated.

3. The method according to claim 1,
    wherein in step D), as a result of the change of the value for the predetermined time span (T_Default+T_Offset(HCnt−1)), the instant of the new commutation after a next sensing of the first pole change is modified in order to bring about an amplitude equalization of the motor current (320) in the at least one phase (126) during different rotation angle ranges (212, 214, 216, 218).

4. The method according to claim 1,
    wherein the predetermined time span (T_Default+T_Offset(HCnt−1)) is defined in such a way that, above a predetermined minimum rotation speed (Nmin), each commutation of the motor current becomes a time-advanced commutation.

5. The method according to claim 1,
    wherein the default time span value (T_Default) is stored in a nonvolatile memory element (131) associated with the motor.

6. The method according to claim 1,
    wherein the default value (T_Default) is ascertained in the context of a calibration of the motor.

7. The method according to claim 1,
    wherein the predetermined time span is increased (S750) if the second value (I_MEAS(HCnt)) is greater than the first value (I_MEAS(HCnt−1)).

8. The method according to claim 7,
    wherein the increase is accomplished by incrementing by a fixed value (S750).

9. The method according to claim 7,
    wherein the increase is accomplished in such a way that a predetermined upper limit value for the respective commutation offset (T_Offset(HCnt−1)) is not exceeded (S740).

10. The method according to claim 1,
    wherein the predetermined time span (T_Default+T_Offset(HCnt−1)) is decreased if the second value is less than the first value (S770).

11. The method according to claim 10,
    wherein the decrease is accomplished by means of a decrementing by a fixed value (S770).

12. The method according to claim 11,
    wherein the decrementing is accomplished in such a way that the commutation offset does not fall below a lower limit value predetermined therefor (S760).

13. The method according to claim 1,
    wherein the commutation offset (T_Offset(HCnt−1)) is ascertained only when the rotor (124) is rotating at least a predetermined minimum rotation speed (Nmin).

14. The method according to claim 1,
    wherein the commutation offset (T_Offset(HCnt−1)) is updated after each revolution of the rotor (124).

15. A method of commutating an electronically commutated motor (120), which motor comprises a rotor (124), at least one phase (126), a power stage (122) for influencing a motor current (320) flowing through the at least one phase (126), a memory (131) adapted to store a motor-specific time span value (T_Default), and a rotor position sensor (140) for generating a rotor position signal (182), which method comprises the steps of:
    A) after a change of the rotor position signal (182), which change is associated with a pole change that follows a commutation of the motor current (320) through the at least one phase (126) and that is referred to hereinafter as a first pole change, ascertaining a first value (I_MEAS(HCnt−1)) of the motor current;
    B) after a predetermined time span (T_Default+T_Offset(HCnt−1)) has elapsed since the first pole change, carrying out a new commutation;
    C) after a change of the rotor position signal (182), which change follows the new commutation and is associated with a pole change that is hereinafter referred to as a second pole change, ascertaining a second value for the motor current (I_MEAS(HCnt));
    D) ascertaining any deviation between the first value (I_MEAS(HCnt−1)) and second value (I_MEAS(HCnt)), and as a function of said deviation, modifying the value for the predetermined time span (T_Default+T_Offset(HCnt−1)) in order to bring about, when this modified value is applied during commutation control, an improved equalization of
the first value for the motor current and
the second value for the motor current; and
    wherein a commutation of the motor current is carried out after each pole change and after the associated predetermined time span (T_Default+T_Offset(HCnt−1)) has elapsed, a default value (T_Default) that has been increased by a commutation offset (T_Offset(HCnt−1)) being used as an initial value for ascertaining the predetermined time span.

16. A method of commutating an electronically commutated motor (120), which motor comprises a rotor (124), at least one phase (126), a power stage (122) for influencing a motor current (320) flowing through the at least one phase (126), a memory (131) adapted to store a motor-specific time span value (T_Default), and a rotor position sensor (140) for generating a rotor position signal (182), which method comprises the steps of:

A) after a change of the rotor position signal (182), which change is associated with a pole change that follows a commutation of the motor current (320) through the at least one phase (126) and that is referred to hereinafter as a first pole change, ascertaining a first value (I_MEAS (HCnt−1)) of the motor current;

B) after a predetermined time span (T_Default+T_Offset (HCnt−1)) has elapsed since the first pole change, carrying out a new commutation;

C) after a change of the rotor position signal (182), which change follows the new commutation and is associated with a pole change that is hereinafter referred to as a second pole change, ascertaining a second value for the motor current (I_MEAS(HCnt));

D) ascertaining any deviation between the first value (I_MEAS(HCnt−1)) and second value (I_MEAS(HCnt)), and as a function of said deviation, modifying the value for the predetermined time span (T_Default+T_Offset (HCnt−1)) in order to bring about, when this modified value is applied during commutation control, an improved equalization of the first value for the motor current and the second value for the motor current; and wherein the first value of the motor current (I_MEAS(HCnt−1)) is ascertained in step A) after expiration of a predetermined waiting time (t_MEAS) after the first change of the rotor position signal (261, 262, 263, 264).

17. A method of commutating an electronically commutated motor (120), which motor comprises a rotor (124), at least one phase (126), a power stage (122) for influencing a motor current (320) flowing through the at least one phase (126), a memory (131) adapted to store a motor-specific time span value (T_Default), and a rotor position sensor (140) for generating a rotor position signal (182), which method comprises the steps of:

A) after a change of the rotor position signal (182), which change is associated with a pole change that follows a commutation of the motor current (320) through the at least one phase (126) and that is referred to hereinafter as a first pole change, ascertaining a first value (I_MEAS (HCnt−1)) of the motor current;

B) after a predetermined time span (T_Default+T_Offset (HCnt−1)) has elapsed since the first pole change, carrying out a new commutation;

C) after a change of the rotor position signal (182), which change follows the new commutation and is associated with a pole change that is hereinafter referred to as a second pole change, ascertaining a second value for the motor current (I_MEAS(HCnt));

D) ascertaining any deviation between the first value (I_MEAS(HCnt−1)) and second value (I_MEAS(HCnt)), and as a function of said deviation, modifying the value for the predetermined time span (T_Default+T_Offset (HCnt−1)) in order to bring about, when this modified value is applied during commutation control, an improved equalization of the first value for the motor current and the second value for the motor current; and wherein at least steps C) and D) are performed only when a symmetrization of the motor current (320) is requested (S670).

18. The method according to claim 17,
wherein an interrupt service routine (152, ISR_HALL) is provided, with which the symmetrization of the motor current is requested (FIG. 6: S670) during operation.

19. An electronically commutated motor that comprises:
a permanent-magnet rotor (124) having at least two rotor poles (183, 186, 188, 189);
a stator (125) having at least one phase (126);
a power stage (122) for controlling a current (320) flowing through the at least one phase (126);
a rotor position sensor (140), controlled by the position of the rotor (124), for generating a rotor position signal (182);
a memory (131) adapted to store a motor-specific time span value (T_Default);
a control circuit (130) that is associated with the motor (120) and is configured to carry out the following steps in order to obtain a more even motor current (320):

A) after a change (261, 262, 263, 264) of the rotor position signal (182), which change is associated with a change (t_HALL) between two rotor poles and follows a commutation of the current (320) through the at least one phase (126), which change is referred to hereinafter as a first pole change, a first value (I_MEAS(HCnt−1)) of the motor current (320) is ascertained;

B) after a predetermined time span (T_Default+T_Offset (HCnt−1)) since the first pole change has elapsed, a new commutation is carried out;

C) after a change (261, 262, 263, 264) of the rotor position signal (182), which change follows the new commutation and is associated with a change between two rotor poles, which change is hereinafter referred to as a second pole change, a second value for the motor current (I_MEAS(HCnt)) is ascertained;

D) ascertaining any deviation between the first value (I_MEAS(HCnt−1)) and second value (I_MEAS(HCnt)), and, based upon said deviation, modifying the value for the predetermined time span (T_Default+T_Offset (HCnt−1)) in order to bring about, when this modified value is used during commutation control, an improved equalization between the first value for the motor current and the second value for the motor current.

20. An electronically commutated motor that comprises:
a permanent-magnet rotor (124) having at least two rotor poles (183, 186, 188, 189);
a stator (125) having at least one phase (126);
a power stage (122) for controlling a current (320) flowing through the at least one phase (126);
a rotor position sensor (140), controlled by the position of the rotor (124), for generating a rotor position signal (182);
a control circuit (130) that is associated with the motor (120) and is configured to carry out the following steps in order to obtain a more even motor current (320):

A) after a change (261, 262, 263, 264) of the rotor position signal (182), which change is associated with a change (t_HALL) between two rotor poles and follows a commutation of the current (320) through the at least one phase (126), which change is referred to hereinafter as a first pole change, a first value (I_MEAS(HCnt−1)) of the motor current (320) is ascertained;

B) after a predetermined time span (T_Default+T_Offset (HCnt−1)) since the first pole change has elapsed, a new commutation is carried out;

C) after a change (261, 262, 263, 264) of the rotor position signal (182), which change follows the new commutation and is associated with a change between two rotor poles, which change is hereinafter referred to as a second pole change, a second value for the motor current (I_MEAS(HCnt)) is ascertained, and said first and second values are compared to ascertain any deviation therebetween;

D) as a function of any deviation between the first value (I_MEAS(HCnt−1)) and second value (I_MEAS(HCnt)), the value for the predetermined time span (T_Default+T_Offset(HCnt−1)) is modified (S730) in order to bring about, when this modified value is used during commutation control, an improved equalization of the first value for the motor current and the second value for the motor current.

21. The motor according to claim 20,
wherein after a minimum rotation speed (Nmin) of the motor is reached, steps A) to D) are continuously repeated.

22. The motor according to claim 20,
wherein in step D), as a result of the change of the value for the predetermined time span (T_Default+T_Offset (HCnt−1)), the instant of the new commutation after a next sensing of the first pole change is modified in order to bring about an amplitude equalization of the motor current (320) in the at least one phase (126) during different rotation angle ranges (212, 214, 216, 218).

23. The motor according to claim 20,
wherein the predetermined time span (T_Default+T_Offset(HCnt−1)) is defined in such a way that, above a predetermined minimum rotation speed (Nmin), each commutation of the motor current becomes a time-advanced commutation.

24. An electronically commutated motor that comprises:
a permanent-magnet rotor (124) having at least two rotor poles (183, 186, 188, 189);
a stator (125) having at least one phase (126);
a power stage (122) for controlling a current (320) flowing through the at least one phase (126);
a rotor position sensor (140), controlled by the position of the rotor (124), for generating a rotor position signal (182);
a control circuit (130) that is associated with the motor (120) and is configured to carry out the following steps in order to obtain a more even motor current (320):
A) after a change (261, 262, 263, 264) of the rotor position signal (182), which change is associated with a change (t_HALL) between two rotor poles and follows a commutation of the current (320) through the at least one phase (126), which change is referred to hereinafter as a first pole change, a first value (I_MEAS(HCnt−1)) of the motor current (320) is ascertained, wherein the first value of the motor current (I_MEAS(HCnt−1)) is ascertained after expiration of a predetermined waiting time (FIG. 2: t_MEAS) subsequent to the first change of the rotor position signal (261, 262, 263, 264);

B) after a predetermined time span (T_Default+T_Offset (HCnt−1)) has elapsed since the first pole change, a new commutation is carried out;
C) after a change (261, 262, 263, 264) of the rotor position signal (182), which change follows the new commutation and is associated with a change between two rotor poles, which change is hereinafter referred to as a second pole change, a second value for the motor current (I_MEAS(HCnt)) is ascertained;
D) as a function of any deviation between the first value (I_MEAS(HCnt−1)) and second value (I_MEAS (HCnt)), the value for the predetermined time span (T_Default+T_Offset(HCnt−1)) is modified in order to bring about, when this modified value is used during commutation control, an improved equalization of the first value for the motor current and the second value for the motor current.

25. An electronically commutated motor that comprises:
a permanent-magnet rotor (124) having at least two rotor poles (183, 186, 188, 189);
a stator (125) having at least one phase (126);
a power stage (122) for controlling a current (320) flowing through the at least one phase (126);
a rotor position sensor (140), controlled by the position of the rotor (124), for generating a rotor position signal (182);
a control circuit (130) that is associated with the motor (120) and is configured to carry out the following steps in order to obtain a more even motor current (320):
A) after a change (261, 262, 263, 264) of the rotor position signal (182), which change is associated with a change (t_HALL) between two rotor poles and follows a commutation of the current (320) through the at least one phase (126), which change is referred to hereinafter as a first pole change, a first value (I_MEAS(HCnt−1)) of the motor current (320) is ascertained;
B) after a predetermined time span (T_Default+T_Offset (HCnt−1)) since the first pole change has elapsed, a new commutation is carried out;
and, when a symmetrization of the motor current (320) is requested (S670), performing the additional steps:
C) after a change (261, 262, 263, 264) of the rotor position signal (182), which change follows the new commutation and is associated with a change between two rotor poles, which change is hereinafter referred to as a second pole change, a second value for the motor current (I_MEAS(HCnt)) is ascertained;
D) as a function of any deviation between the first value (I_MEAS(HCnt−1)) and second value (I_MEAS (HCnt)), the value for the predetermined time span (T_Default+T_Offset(HCnt−1)) is modified in order to bring about, when this modified value is used during commutation control, an improved equalization of the first value for the motor current and the second value for the motor current.

* * * * *